United States Patent [19]

Wachi

[11] Patent Number: 5,121,016
[45] Date of Patent: Jun. 9, 1992

[54] LINEAR MOTOR

[75] Inventor: Shigeaki Wachi, Tokyo, Japan

[73] Assignee: Sony Corporation, Tokyo, Japan

[21] Appl. No.: 709,702

[22] Filed: Jun. 3, 1991

[30] Foreign Application Priority Data

Jun. 8, 1990 [JP] Japan ................................. 2-148756

[51] Int. Cl.⁵ ........................................... H02K 41/00
[52] U.S. Cl. ........................................ 310/14; 310/12;
 360/78.04; 369/215
[58] Field of Search ........................ 310/12, 14, 68 B;
 360/78.01, 78.04, 78.12, 78.13; 369/215, 219,
 225, 249

[56] References Cited

U.S. PATENT DOCUMENTS

| Re. 32,285 | 11/1986 | Farmer et al. | 360/106 |
|---|---|---|---|
| 4,093,897 | 6/1978 | Fujita et al. | 310/268 |
| 4,743,987 | 5/1988 | Farmer et al. | 360/106 |
| 4,964,111 | 10/1990 | Hangai et al. | 369/215 |

FOREIGN PATENT DOCUMENTS

| 0126522 | 10/1979 | Japan | 360/78.12 |
|---|---|---|---|
| 0145558 | 6/1987 | Japan | 360/78.01 |
| 0009085 | 1/1988 | Japan | 360/78.04 |
| 0033763 | 2/1990 | Japan | 360/78.01 |

Primary Examiner—Steven L. Stephan
Assistant Examiner—Judson H. Jones
Attorney, Agent, or Firm—Philip M. Shaw, Jr.

[57] ABSTRACT

A linear motor comprising first and second magnetic members with first and second magnets secured to and cooperating respectively with the first and second magnetic members to form first and second magnetic circuits each having a magnetic gap formed therein, first and second driving coils mounted for integral movement with each other along the magnetic gaps and each including a driving coil winding wound in such a manner as to partially extend perpendicularly across a magnetic field produced in the magnetic gap by the first or second magnet and a velocity detecting coil winding wound in an overlapping relationship with the driving coil winding, the velocity detecting coil windings of the first and second driving coils being wound and connected to each other such that voltages induced in the velocity detecting coil windings of the first and second driving coils by external magnetic fields from a common magnetic field other than the magnetic fields produced by the first and second magnets are cancelled by each other, but voltages induced by the internal magnetic fields produced by the first and second magnets are added to each other.

4 Claims, 3 Drawing Sheets

LINEAR MOTOR

BACKGROUND OF THE INVENTION

1. Field of the Invention

This invention relates to a linear motor suitable for moving an optical head for the irradiation of a beam of laser light in an optical disk recording/reproducing apparatus.

2. Description of the Prior Art

An optical head for irradiating a beam of laser light upon a record face of a disk in a photo-electromagnetic disk recording/reproducing apparatus or the like has been put into practical use generally in two different types including a type which is driven by a dc motor and another type which is driven by a linear motor. An optical head of the type which is driven by a linear motor is advantageous in that the driving mechanism therefor is comparatively simple and the velocity control can be achieved comparatively readily.

In such arrangement, the velocity of movement of the optical head carried on the linear motor is controlled such that the back electromotive force generated in a driving coil of the linear motor is detected and a drive voltage is supplied in time division to the driving coil, but when the drive voltage is not supplied, the velocity of movement of the linear motor is detected from the back electromotive force constant of the driving coil to control the movement of the optical head.

Such a linear motor includes a single coil which serves as a drive coil and also as a detecting coil and is simple in winding thereof. However, it has a drawback in that, since the back electromotive force constant is low, a velocity detection signal having a high S/N ratio cannot be obtained therefrom. Accordingly, it has a problem that the optical head does not perform an accurate seeking operation.

Also an alternative arrangement has been proposed wherein an optical head is moved by a pair of thread mechanisms so that it may be moved by a linear motor formed from one of the thread mechanisms while a velocity thereof is detected mainly by another linear motor formed from the other thread mechanism. Such arrangement, however, has a problem that, since the linear motors are not good in balance, a rattling movement of the optical head takes place upon sudden movement thereof, which results in an increase in the seeking time.

SUMMARY OF THE INVENTION

It is an object of the present invention to provide a linear motor by which the speed of movement of an optical head for which the linear motor is provided can be detected with a high sensitivity.

It is another object of the present invention to provide a linear motor from which a detection signal of a high S/N ratio can be obtained.

In order to attain the objects, according to the present invention, there is provided a linear motor which comprises first and second magnetic members and first and second magnets secured to and cooperating respectively with the first and second magnetic members to form first and second magnetic circuits each having a magnetic gap formed therein, and first and second driving coils mounted for integral movement with each other along the magnetic gaps and each including a driving coil winding wound in such a manner as to partially extend perpendicularly across a magnetic field produced in the magnetic gap by the first or second magnet and a velocity detecting coil winding wound in an overlapping relationship with the driving coil winding, the velocity detecting coil windings of the first and second driving coils being wound and connected to each other such that voltages induced in the velocity detecting coil windings of the first and second driving coils by external magnetic fields from a common magnetic field other than the magnetic fields produced by the first and second magnets are cancelled by each other, but voltages induced by the internal magnetic fields produced by the first and second magnets are added to each other. Preferably, the first and second magnetic members are magnetized in a magnetically saturated condition by the first and second magnets, respectively.

With the linear motor, since the velocity detecting coil windings are around in an overlapping relationship on the driving coil windings which are disposed in such a manner as to partially extend perpendicularly across the magnetic fields produced in the magnetic gaps by the first and second magnets, the velocity of movement of the driving coils and hence of an optical head to which the driving coils are connected can be detected with a high sensitivity.

Further, since the velocity detecting coil windings are wound and connected to each other such that a possible influence of an external magnetic field upon the velocity detecting coils is minimized, a detection signal of a high S/N ratio can be obtained from either of the velocity detecting coil windings.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
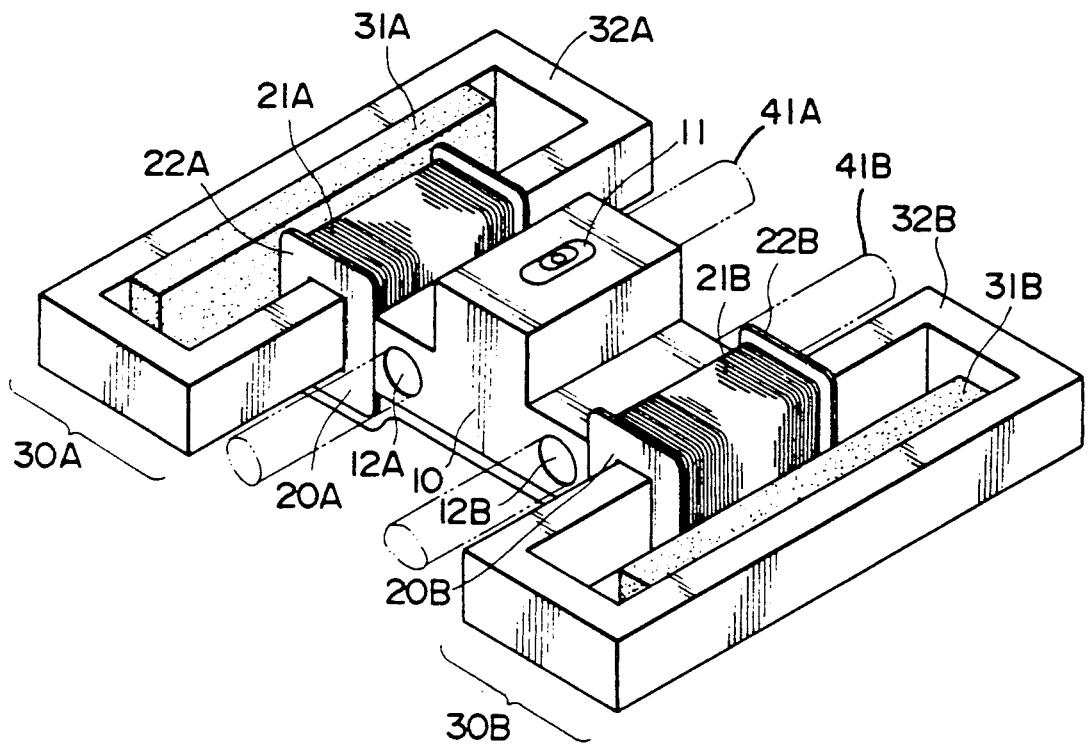
FIG. 1 is a schematic perspective view of a linear motor showing a preferred embodiment of the present invention.

Referring first to FIG. 1, there is shown a linear motor to which the present invention is applied. The linear motor is designed to move an optical head of an optical disk recording/reproducing apparatus (not shown). The optical head generally denoted at 10 has an objective portion 11 provided on an upper face thereof. A pair of left and right driving coils 20A and 20B of the linear motor for moving the optical head 10 are mounted on the opposite sides of the optical head 10. The optical head 10 has a pair of guide holes 12A and 12B perforated therein, and a pair of thread feed shafts 41A and 41B extend through the guide holes 12A and 12B, respectively, so that the optical head 10 may be supported for movement of the thread feed shafts 41A and 41B in a radial direction of an optical disk not shown which is to be recorded or reproduced on the optical disk recording/reproducing apparatus.

Each of the driving coils 20A and 20B includes a bobbin 22A or 22B and a driving coil winding 21A or 21B wound on the bobbin 22A or 22B thereof.

A pair of magnetic circuits 30A and 30B are provided for generating magnetic fields for moving the driving coils 20A and 20B, respectively. The magnetic circuits 30A and 30B are secured to a fixed deck (not shown) of the optical disk recording/reproducing apparatus and each constitutes a stator portion of the linear motor.

Each of the magnetic circuits 30A and 30B includes a magnet 31A or 31B having a flattened profile and a magnetic member 32A or 32B having a rectangular frame-like profile in plan. Each of the magnets 31A and 31B is magnetized in a thicknesswise direction such that one of the north and south poles thereof appears on a major face thereof at which it is adhered to an inner face of one of a pair of longitudinal or major sides of the corresponding magnetic member 32A or 32B. Consequently, magnetic fluxes from the opposite major face of the magnet 31A or 31B at which the other magnetic pole appears flow to the other major side of the magnetic member 32A or 32B across a magnetic gap. The driving coils 20A and 20B are fitted for movement on the other major sides of the magnetic members 32A and 32B, respectively, such that the driving coil windings 21A and 21B partially extend perpendicularly across such magnetic fluxes in the magnetic gaps. Accordingly, when the driving coil 20A or 20B is energized, electric current flowing through the driving coil winding 21A or 21B thereof cooperates with magnetic fluxes from the magnet 31A or 31B in the magnetic gap to generate a driving force to move the driving coil 20A or 20B in a perpendicular direction to the electric current and also to the magnetic fluxes, that is, in a direction parallel to the thread shafts 41A and 41B. Thus, the optical head 10 is moved in one or the other direction along the thread shafts 41A and 41B depending upon the direction in which electric current flows in the driving coil 20A or 20B.

Figure 2:
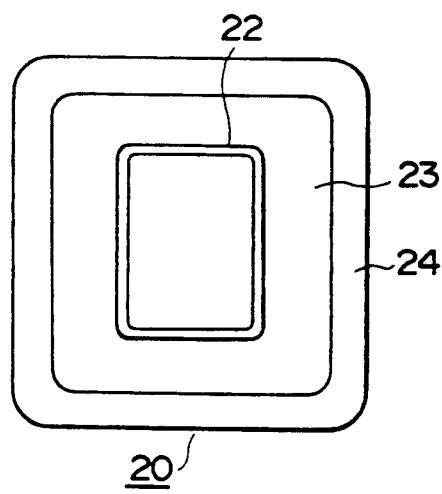
FIG. 2 is a sectional view showing, in an enlarged scale, a driving coil of the linear motor of FIG. 1.

Referring to FIG. 2, each of the driving coils 20A and 20B of the linear motor includes a driving coil winding 23 of a large wire diameter through which a comparative high electric current can flow and a detecting coil winding 24 of a comparatively small wire diameter wound in 5,000 turns as a secondary winding around the driving coil winding 23.

Thus, when the driving coil windings 23 of the driving coils 20A and 20B are energized, the optical head 10 is moved across the magnetic gaps of the magnetic circuits 30A and 30B.

On the other hand, when the driving coils 20A and 20B are moving by their own inertia, the velocity of the movement of the optical head 10 can be detected from a voltage induced in either of the detecting coil windings 24 which move perpendicularly across the magnetic fields in the magnetic gaps.

In the linear motor of the present invention, the detecting coil windings 24 are connected such that induced voltages thereof may cancel an external magnetic field.

Figure 3:
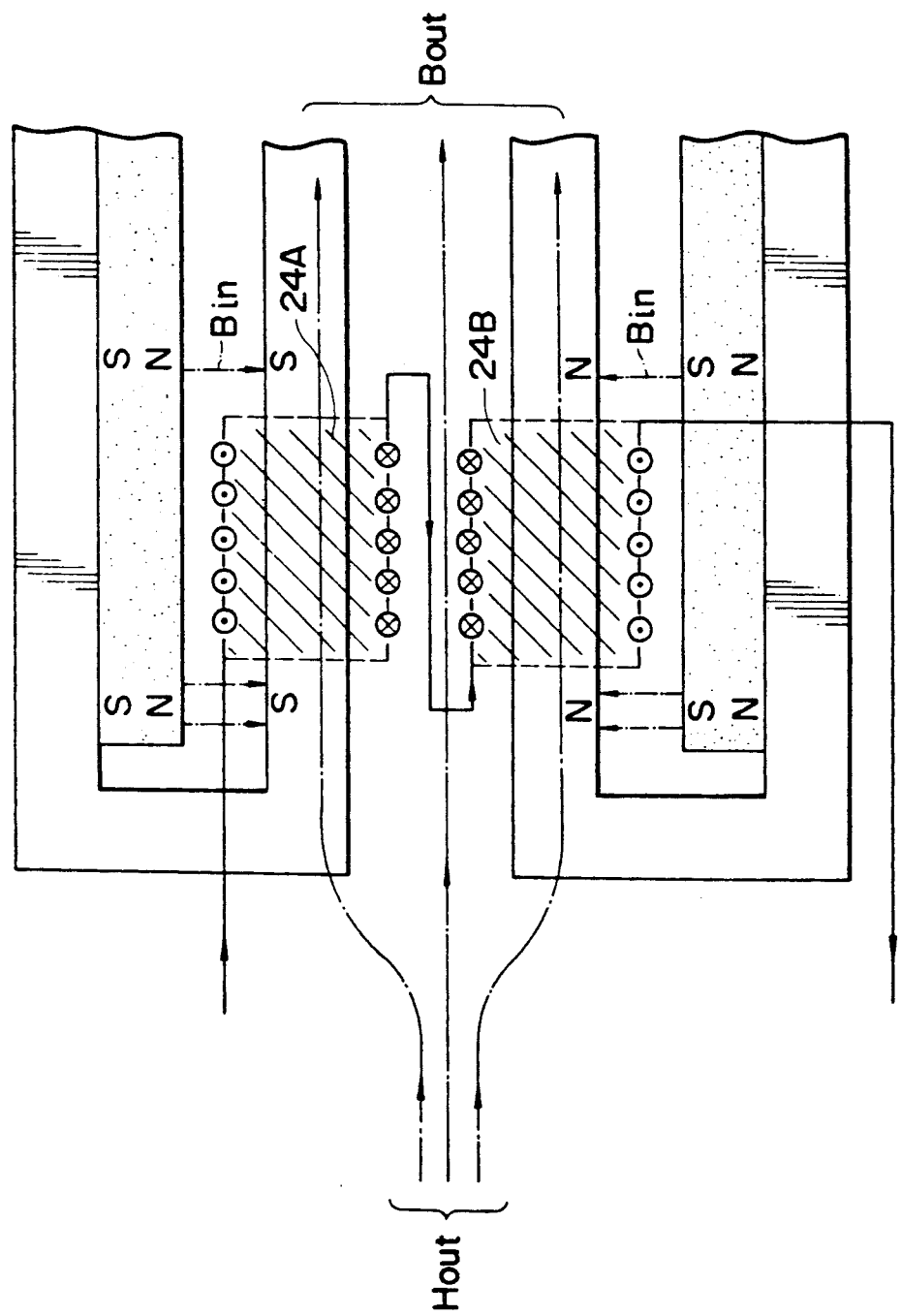
FIG. 3 is a diagrammatic representation illustrating the operation of a velocity detecting coil winding of the linear motor of FIG. 1.

In particular, referring to FIG. 3, the two detecting coil windings 24A and 24B are wound and connected to each other such that the directions of electric currents (indicated by the marks ⊙ and ◯) conform to internal magnetic fluxes $B_{in}$ generated from the magnets 31A and 31B so that driving forces are produced in the same direction, but when a magnetic field $H_{out}$ applied from the outside is introduced into both of the magnetic circuits 30A and 30B, a voltage induced in the detecting coil winding 24A by external magnetic fluxes $B_{out}$ produced by such magnetic field $H_{out}$ acts in the opposite direction to, and hence cancels, another voltage induced in the other detecting coil winding 24B by such external magnetic fluxes $B_{out}$ produced by the magnetic field $H_{out}$.

Accordingly, the number of turns of the detecting coil windings 24A and 24B can be increased to increased the detection voltage and improve the S/N ratio of the detecting coil windings 24A and 24B.

Further, in the linear motor of the present invention, the sectional areas of the magnetic members 32A and 32B shown in FIG. 1 are set comparatively small with respect to magnetizing forces of the magnets 31A and 31B so that the magnetic paths of the magnetic members 32A and 32B may be saturated readily with magnetic fluxes from the magnets 31A and 31B.

Figure 4:
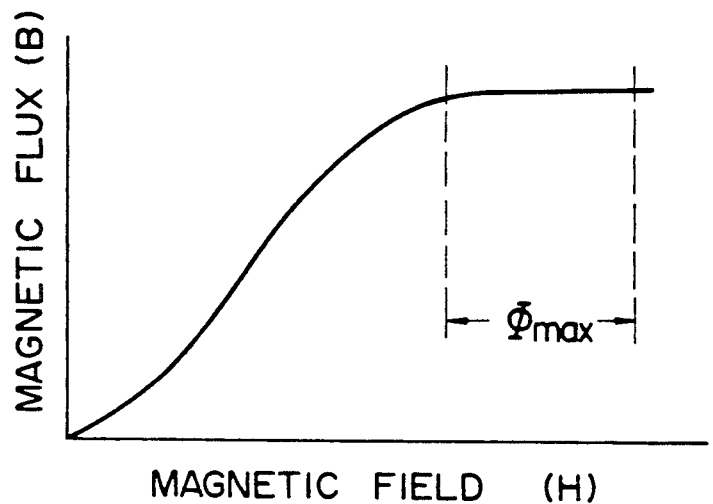
FIG. 4 is a graph illustrating a magnetization condition of a magnetic circuit.

In particular, a magnetic bias is applied to the magnetic members 31A and 31B such that the magnetization characteristic of the magnetic members 31A and 31B may be included in a saturation area $\Phi_{max}$ shown in FIG. 4. Consequently, a magnetic flux variation circulating in the magnetic members 31A and 31B is suppressed in the saturation area. As a result, a possible influence of external noises can be further reduced.

Figure 5:
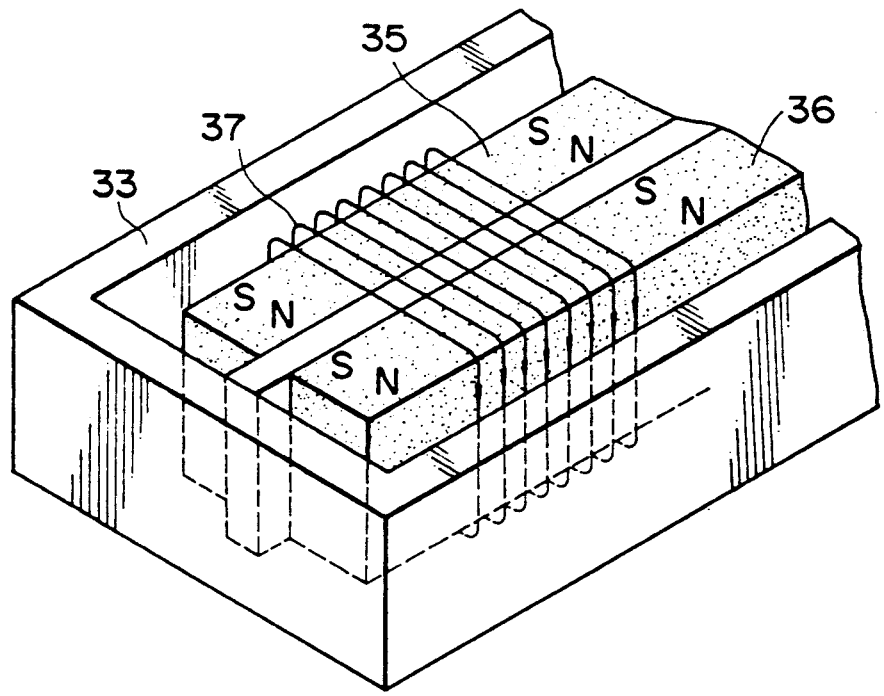
FIG. 5 is a perspective view showing another form of magnetic circuit.

Referring now to FIG. 5, there is shown a modified linear motor in which a modified magnetic circuit is incorporated. The modified linear motor includes a magnetic member 33 having a substantially E-shape in plan and a pair of flattened magnets 35 and 36 secured to a central portion 34 of the magnetic member 33 and magnetized in thicknesswise directions thereof such that they are secured at faces thereof at which the opposite magnetic poles (the north pole and the south pole) appear as seen in FIG. 5.

A coil winding 37 is wound as indicated by solid lines in FIG. 5 such that it surrounds an outer periphery of the magnets 35 and 36. Consequently, in the present linear motor, a driving force is produced at two locations of the coil winding 37 in two magnetic gaps formed between the magnetic member 33 and the magnets 35 and 36. Velocity detection can be achieved from an induced voltage of a secondary winding not shown which may be provided similarly as in the linear motor shown in FIG. 1.

Having now fully described the invention, it will be apparent to one of ordinary skill in the art that many changes and modifications can be made thereto without departing from the spirit and scope of the invention as set forth herein.

What is claimed is:

1. A linear motor, comprising first and second magnetic members and first and second magnets secured to and cooperating respectively with said first and second magnetic members to form first and second magnetic circuits each having a magnetic gap formed therein, and first and second driving coils mounted for integral movement with each other along the magnetic gaps and each including a driving coil winding wound in such a manner as to partially extend perpendicularly across a magnetic field produced in the magnetic gap by said first or second magnet and a velocity detecting coil winding wound in an overlapping relationship with said driving coil winding, the velocity detecting coil windings of said first and second driving coils being wound and connected to each other such that voltages induced in said velocity detecting coil windings of said first and second driving coils by external magnetic fields from a common magnetic field other than the magnetic fields produced by said first and second magnets are cancelled by each other, but voltages induced by the internal magnetic fields produced by said first and second magnets are added to each other.

2. A linear motor according to claim 1, wherein said first and second magnetic members are magnetized in a magnetically saturated condition by said first and second magnets, respectively.

3. A linear motor according to claim 1, wherein each of said first and second magnetic members has a rectangular frame-like profile, and each of said first and second magnets is secured to an inner face of one of a pair of longitudinal sides of said first or second magnetic member while said first and second driving coils are fitted for movement on the other longitudinal sides of said first and second magnetic members, respectively.

4. A linear motor according to claim 1, wherein each of said first and second magnetic members has a substantially E-shaped profile, and each of said first and second magnets includes a pair of magnet elements secured at the opposite magnetic pole portions thereof to the opposite faces of a central leg of said first or second magnetic member while the driving coil winding and the velocity detecting coil winding of a corresponding one of said first and second driving coils are wound in such a manner as to surround said pair of magnetic elements.

* * * * *